United States Patent
Takasaka (10) Patent No.: US 6,742,641 B2
(45) Date of Patent: Jun. 1, 2004

(54) ROTATIONAL DRIVING APPARATUS OF MAGNETIC TAPE DEVICE AND MAGNETIC TAPE DEVICE

(75) Inventor: Daisuke Takasaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/351,858

(22) Filed: Jan. 27, 2003

(65) Prior Publication Data

US 2003/0141162 A1 Jul. 31, 2003

(30) Foreign Application Priority Data

Jan. 29, 2002 (JP) .................................. 2002-000337 U (51) Int. Cl.$^7$ .............................................. G11B 15/00
(52) U.S. Cl. .................. 192/48.9; 192/48.5; 242/356.3; 242/356.5; 360/96.3; 360/96.4
(58) Field of Search ............................. 192/48.9, 55.1, 192/56.55, 48.5, 53.1, 69.9; 242/354.3, 356.5; 360/96.3, 96.4

(56) References Cited

U.S. PATENT DOCUMENTS

| | | | | | |
|---|---|---|---|---|---|
| 4,681,281 A | * | 7/1987 | Aarts et al. | ............... | 242/356.5 |
| 4,964,589 A | * | 10/1990 | Okada | ..................... | 242/354.2 |
| 5,003,418 A | * | 3/1991 | Yang | ........................ | 242/356.5 |
| 5,472,151 A | * | 12/1995 | Choi et al. | ................ | 242/356.4 |
| 5,499,777 A | * | 3/1996 | Ahn | ............................. | 242/356 |
| 5,511,738 A | * | 4/1996 | Seo et al. | .................... | 242/356 |
| 5,735,476 A | * | 4/1998 | Kim et al. | ................. | 242/356.3 |
| 5,788,175 A | * | 8/1998 | Hwang | ..................... | 242/356.5 |
| 6,550,711 B2 | * | 4/2003 | Sawai et al. | .............. | 242/356.3 |
| 2002/0070091 A1 | * | 6/2002 | Hong et al. | ................ | 192/81 C |

FOREIGN PATENT DOCUMENTS

JP        5-274749        10/1993        ........... G11B/15/30

* cited by examiner

Primary Examiner—Saúl Rodriguez
(74) Attorney, Agent, or Firm—Osha & May L.L.P.

(57) ABSTRACT

A rotational driving apparatus of a magnetic device, a clutch mechanism or a speed change clutch mechanism is provided selectively in a path for transmitting a rotation from a capstan motor to a feed reel or a take-up reel. The clutch mechanism decelerates the rotation of the motor at a first reduction ratio, and transmits the resultant rotation to a change-over gear. The speed change clutch mechanism has a first transmission shaft, a pulley gear, a constant torque transmission member, a speed change output gear, speed change intermediate gear and a speed change movable gear. The speed change intermediate gear and speed change movable gear are mounted on a second transmission shaft provided close to a first transmission shaft, and transmit the rotation of the pulley gear to the speed change output gear via a constant torque transmission member, or directly with the speed of the rotation changed.

7 Claims, 4 Drawing Sheets

ROTATIONAL DRIVING APPARATUS OF MAGNETIC TAPE DEVICE AND MAGNETIC TAPE DEVICE

The present disclosure relates to the subject matter contained in Japanese Utility Model Application No. U2002-000337 filed Jan. 29, 2002, which is incorporated herein by reference in its entirety.

BACKGROUND OF THE INVENTION

1. Field of the Invention

This invention relates to a rotational driving apparatus of a magnetic tape device, particularly to a rotational driving apparatus capable of rapidly forwarding and rewinding a magnetic tape.

2. Description of the Related Art

Fast forwarding and rewinding of a magnetic tape device are carried out frequently, such as when finishing a reproduction, or when selecting images. In order to carry out such the fast forwarding and rewinding of a magnetic tape, it is necessary that the magnetic tape be made to run at a speed higher than a normal level.

It is conceivable to set a reduction ratio in a rotation transmission path extending from a motor to a reel low so as to increase a rotational speed of the reel. However, if the reduction ratio is set too low, the motor need to be rotated at a very low speed during a normal reproduction operation. As a result, the rotational stability of the reel during the reproduction operation is deteriorated. This may cause a disarrangement of a reproduced picture image or a deterioration of the quality of a reproduced picture image.

A magnetic tape device capable of carrying out rapid forwarding and rewinding of a magnetic tape is provided with a mechanism for transmitting a motor rotation to a reel through a transmission path different from that used during a reproduction operation, just as disclosed in, for example, JP-A-5-274749.

In a magnetic tape device provided with a rotation transmission path different from that used during a reproduction operation so as to enable a rapid forwarding and rewinding of a magnetic tape to be carried out, the number of parts increases by constructing the additional rotation transmission path, and the universality of the magnetic tape device is lost due to the special construction. Also, there may be some cases where a space in which parts necessary for carrying out the rapid forwarding and rewinding of a magnetic tape are installed need to be provided. Such a magnetic tape device goes against a space saving concept.

SUMMARY OF THE INVENTION

An object of the present invention is to provide a rotational driving apparatus of a magnetic tape device capable of carrying out rapid forwarding and rewinding of a magnetic tape without specially changing the construction thereof and without causing the quality of a reproduced picture image to be deteriorated.

According to a first aspect of the invention, there is provided a rotational driving apparatus of a magnetic tape device adapted to transmit a rotation of a motor to a clutch mechanism, and transmit the rotation of the clutch mechanism to a feed reel or a take-up reel selectively via a rotation transmission path change-over gear. A first clutch mechanism and a second clutch mechanism can be provided selectively as the clutch mechanism. The first clutch mechanism being adapted to decelerate the rotation of the motor at a first reduction gear ratio, and transmit the resultant rotation to the change-over gear. The first clutch mechanism has a first shaft, a first pulley, a first clutch output gear, a first constant torque transmission member and a clutch member. The first pulley is adapted to receive the rotation of the motor and supported rotatably on the first shaft. The first clutch output gear is meshed with the change-over gear supported rotatably on the first shaft. The first constant torque transmission member is provided between the first pulley and first clutch output gear and adapted to transmit torque of lower than a predetermined level from the second pulley thereto. The clutch member is adapted to transmit the rotation of the first pulley to the first clutch output gear via the first constant torque transmission member or directly. On the other hand, the second clutch mechanism is adapted to decelerate the rotation of the motor at a second reduction ratio and transmit the resultant rotation to the change-over gear. The second clutch mechanism has a second shaft, a second pulley, a second clutch output gear, a second constant torque transmission member and a speed change clutch member. The second pulley is supported rotatably on the second shaft. The second clutch output gear is meshed with the change-over gear supported rotatably on the second shaft. The second constant torque transmission member is provided between the second pulley and second output gear and adapted to transmit torque of lower than a predetermined level from the second pulley thereto. The speed change clutch member is provided close to the second shaft and adapted to transmit the rotation of the second pulley to the second clutch output gear via the second constant torque transmission member or directly with the speed of the rotation changed.

In this rotational driving apparatus of a magnetic tape device, the first clutch mechanism and second clutch mechanism can be provided selectively as the clutch mechanism for the rotation transmission path. In the second clutch mechanism, which is different from the first clutch mechanism, the transmission of the rotation of the motor can be carried out with the speed of the rotation changed. Namely, when the speed of the rotation of the motor is changed by the second clutch mechanism at the time of, for example, carrying out rapid forwarding and rewinding of a magnetic tape, these magnetic tape handling operations can be executed at a high speed as compared with the same operations in a case where the first clutch mechanism is used. Conversely, since the speed of the rotation is changed at the time of carrying out rapid forwarding and rewinding of the magnetic tape, the reel can be rotated stably at a low speed at the time of the reproduction. Moreover, this rotational driving apparatus of a magnetic tape device is capable of using structures, other than the clutch mechanism, in common. Therefore, this rotational driving apparatus of a magnetic tape device is capable of improving a mass production efficiency thereof, and manufacturing the apparatus at a low cost.

According to a second aspect of the invention, the clutch member of the first clutch mechanism is supported on the first shaft axially movably so that the clutch member can be rotated with respect to the first shaft and engaged with and disengaged from the first pulley, the clutch member in a first pulley-disengaged state transmits the rotation of the first pulley to the first clutch output gear via the first constant torque transmission member, the clutch member in a first pulley-engaged state transmits the rotation of the first pulley to the clutch output gear directly.

In this apparatus, the clutch member is engageable with and disengageable from the first pulley. When the clutch member is disengaged from the first pulley, the rotation of the first pulley is transmitted to the first clutch output gear by the first constant torque transmission member, so that only the torque of lower than a predetermined level is transmitted. Therefore, when a sudden torque is transmitted from the motor, the transmission of the torque to the first clutch output gear can be prevented. This enables the possibility that a sudden tension, which causes the magnetic tape to be broken in some cases, be imparted to the magnetic tape to be eliminated. On the other hand, when the clutch member is engaged with the first pulley at the time of carrying out rapid forwarding and rewinding of the magnetic tape, the rotation of the motor can be wholly transmitted.

According to a third aspect of the invention, the second pulley of the second clutch mechanism has a gear portion at an outer circumferential section thereof. The second clutch mechanism has a transmission gear to which the rotation of the second pulley is transmitted via the second constant torque transmission member. The speed change clutch member of the second clutch mechanism has a speed change support shaft, a speed change intermediate gear and a clutch. The speed change support shaft is provided in parallel with the second shaft. The speed change intermediate gear is supported rotatably on the speed change support shaft and meshed with the gear portion of the second pulley. The clutch is supported on the speed change support shaft rotatably and axially movably so that the clutch can be engaged with and disengaged from the speed change intermediate gear. The clutch has a first gear portion meshable with the transmission gear, and a second gear portion meshable with the second clutch output gear. The clutch is adapted to change in a speed change intermediate gear-disengaged state a speed of the rotation from the transmission gear via the first gear portion and second gear portion, and transmit the resultant rotation to the second clutch output gear; and transmit in a speed change intermediate gear-engaged state the rotation of the speed change intermediate gear to the second clutch output gear via the second gear portion. The number of the teeth of the first gear portion and that of the teeth of the second gear portion are equal to each other and larger than that of the teeth of the speed change intermediate gear. The number of the teeth of the transmission gear and that of the teeth of the second clutch output gear are equal to each other and smaller than that of the teeth of the gear portion of the second pulley.

In this apparatus, the clutch can be engaged with and disengaged from the speed change intermediate gear. When the clutch is disengaged from the speed change intermediate gear, the rotation of the second pulley can be output to the second clutch output gear. Since the rotation of the second pulley is transmitted to the second clutch output gear by the second constant torque transmission member, only the torque lower than a predetermined level is transmitted. Therefore, when a sudden torque is transmitted from the motor, the transmission of the torque to the second clutch output gear can be avoided. As a result, the possibility that a sudden tension, which causes the magnetic tape to be broken, be imparted to the magnetic tape can be eliminated. As a transmission path, a path in which the rotation of the motor is transmitted to the change-over gear via the second pulley, second constant torque transmission member, clutch (first gear portion and second gear portion) and second clutch output gear may be used.

When the clutch is engaged with the speed change intermediate gear at the time of carrying out rapid forwarding and rewinding of a magnetic tape, the rotation of the motor can be wholly transmitted. Since during this time a speed of the rotation of the second pulley is changed with the resultant rotation transmitted to the second clutch output gear, rapid forwarding and rewinding of the magnetic tape can be achieved. As a transmission path, a path in which the rotation of the motor is transmitted to the change-over gear via the second pulley, speed change intermediate gear, clutch (second gear portion) and second clutch output gear maybe used. Therefore, the reduction ratio is different due to a difference in the number of teeth in the transmission path as compared with a reduction ratio in a case where the clutch is not engaged with the speed change intermediate gear, so that it follows that a speed change is certainly made.

As described above, a reduction ratio employed when the reel is rotated at a low speed at the time of reproducing or the like, and a reduction ratio employed when the reel is rotated at a high speed at the time of carrying out rapid forwarding and rewinding of the magnetic tape can be set to different levels. Therefore, rotating the reel stably at a low speed and rotating the reel at a high speed can be done compatibly.

According to a fourth aspect of the invention, a rotational driving apparatus of a magnetic tape device is formed so as to transmit a rotation of a motor to a clutch mechanism, and the rotation of the clutch mechanism to a feed reel or a take-up reel selectively via a rotation transmission path change-over gear. The clutch mechanism includes a first shaft, a pulley, a transmission gear, a constant torque transmission member, a speed change output gear, a second shaft, a speed change intermediate gear and a clutch. The pulley is supported rotatably on the first shaft, has a gear portion at an outer circumferential section thereof and is adapted to receive the rotation transmitted from the motor. The transmission gear is supported rotatably on the first shaft. The constant torque transmission member is adapted to transmit torque of lower than a predetermined level from the pulley to the transmission gear. The speed change output gear is supported rotatably on the first shaft and meshed with the change-over gear. The second shaft is provided in parallel with the first shaft. The speed change intermediate gear is supported rotatably on the second shaft and meshed with the gear portion of the pulley. The clutch has a first gear portion meshable with the transmission gear, and a second gear portion supported movably and rotatably on the second shaft and meshable with a speed change output gear. The clutch can take a first position in which the clutch is disengaged from the speed change intermediate gear and transmits the rotation of the transmission gear to the speed change output gear via the first gear portion and second gear portion, and a second position in which the clutch is engaged with the speed change intermediate gear and transmits the rotation of the speed change intermediate gear to the speed change output gear via the second gear portion.

In this apparatus, the clutch can be engaged with and disengaged from the speed change intermediate gear. When the clutch is disengaged from the speed change intermediate gear, i.e., in the first position, the rotation of the pulley can be output to the clutch output gear by the constant torque transmission member. Since the constant torque transmission member transmits the rotation of the pulley to the clutch output gear, only torque of lower than a predetermined level is transmitted. Therefore, the possibility that a sudden tension, which causes the magnetic tape to be broken, be imparted to the magnetic tape is thereby eliminated. As a transmission path, path in which the rotation of the motor is transmitted to the change-over gear via the pulley, constant torque transmission member, transmission gear, clutch (first gear portion and second gear portion) and clutch output gear may be used.

When rapid forwarding and rewinding of the magnetic tape are carried out, the clutch is engaged with the speed change intermediate gear. When the clutch is in the second position, the rotation of the motor can be wholly transmitted. At this time, the rotation of the pulley is transmitted to the clutch output gear by changing the speed thereof, so that the forwarding and rewinding of the magnetic tape can be done at a high speed. As a transmission path, a path in which the rotation of the motor is transmitted to the change-over gear via the pulley, speed change intermediate gear, clutch (second gear portion) and clutch output gear may be used. Therefore, the reduction ratio is different from that employed in a case where the clutch is not engaged with the speed change intermediate gear due to a difference between the number of the teeth in the transmission paths in these cases, so that it follows that a speed change is certainly made.

As described above, a reduction ratio employed when the reel is rotated at a low speed at the time of reproducing or the like, and a reduction ratio employed when the reel is rotated at a high speed at the time of carrying out rapid forwarding and rewinding, etc. of the magnetic tape can be set to different levels. Therefore, rotating the reel stably at a low speed and rotating the reel at a high speed can be done compatibly.

Since the structure of the clutch mechanism is simple, it becomes possible to manufacture a rotational driving apparatus at a low cost.

DETAILED DESCRIPTION OF THE PREFERRED EMBODIMENTS

Figure 1:
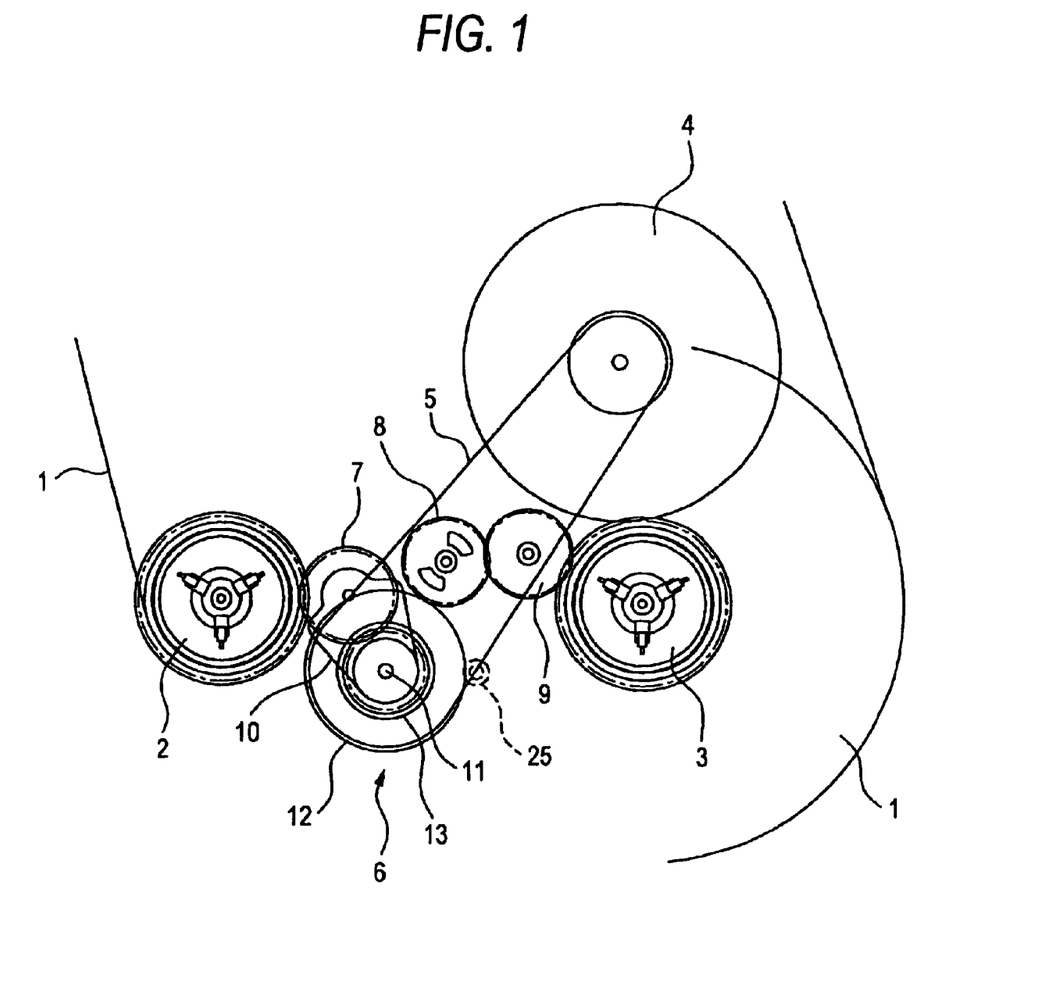
FIG. 1 is a drawing showing a reel driving torque transmission path in a magnetic tape device provided with a clutch mechanism.
Figure 2:
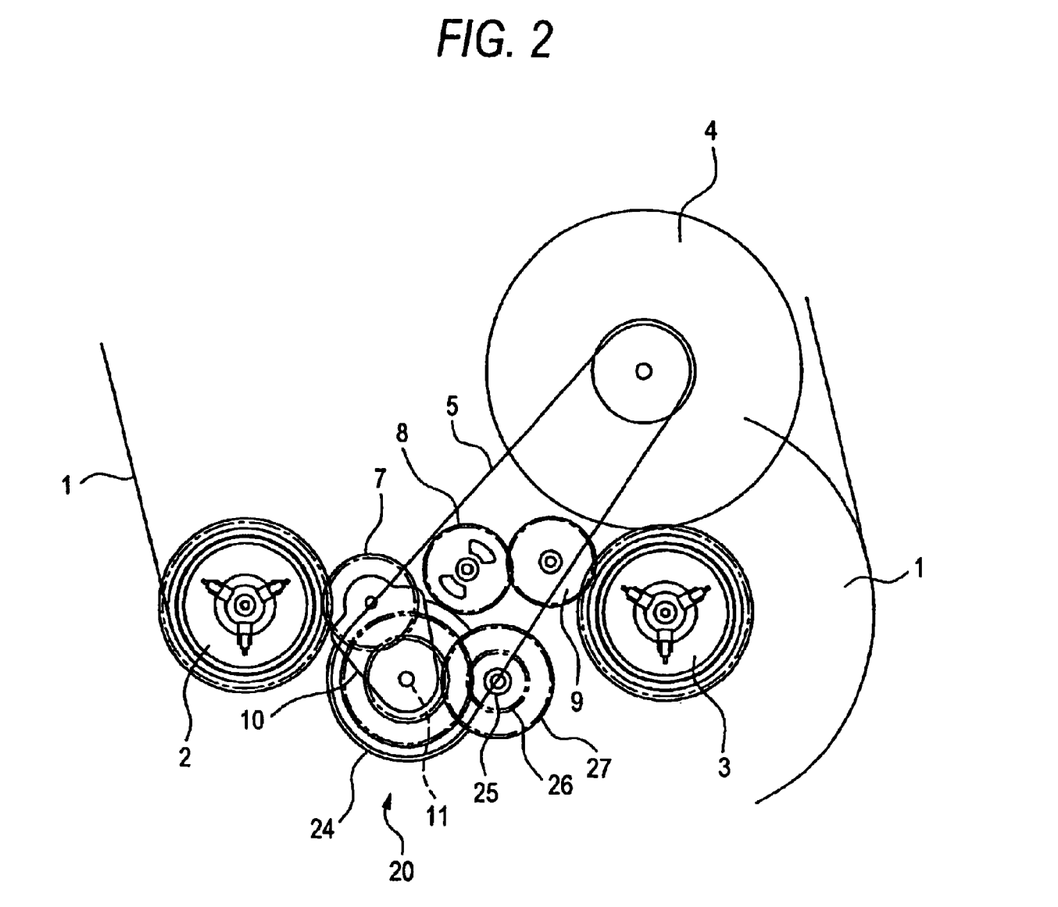
FIG. 2 is a drawing showing a reel driving torque transmission path in a magnetic tape device provided with a speed change clutch mechanism.

Embodiments of a rotational driving apparatus of a magnetic tape device according to the present invention will be shown in FIG. 1 and FIG. 2. FIG. 1 shows an apparatus for attaining 90 times speeded-up magnetic tape forwarding and rewinding operations, and FIG. 2 shows an apparatus for attaining 300 times speeded-up magnetic tape forwarding and rewinding operations. These apparatuses can be embodied by only replacing some parts thereof with others. First, a description of the apparatus of FIG. 1 will be given, and then a description of the apparatus of FIG. 2 concerning only the differences from the apparatus of FIG. 1 will be given.

The magnetic tape device shown in FIG. 1 is a device in which a magnetic tape 1 is fed from a feed reel 2 to a take-up reel 3, and image and voice signals are recorded as magnetic data on the magnetic tape 1 by a magnetic head (not shown), and the recorded magnetic data are reproduced by the magnetic head. Incidentally, FIG. 1 and FIG. 2 show a condition in which almost all of the magnetic tape 1 is taken up around the take-up reel 3.

The feed reel 2 and take-up reel 3 are adapted to be driven by a driving unit. The driving unit has a capstan motor 4 as a driving power source, a belt 5 for transmitting the rotation of the capstan motor 4 to each reel, a clutch mechanism 6, an idler gear 7, a sensor gear 8 and an intermediate gear 9.

The belt 15 is passed around a pulley provided on the capstan motor 4 and a pulley provided on the clutch mechanism 6.

The clutch mechanism 6 is a mechanism for transmitting the rotation of the capstan motor 4 to the idler gear 7, and will be described in detail later.

The idler gear 7 can be swung by a swinging member 10 having a rotary shaft (first transmission shaft 11 which will be described later) of the clutch mechanism 6 as a fulcrum. This gear 7 is adapted to determine selectively whether the rotation of the clutch mechanism 6 is transmitted to the take-up reel 3 or feed reel 2. Namely, when the idler gear 7 and a gear provided on the side of the feed reel 2 are meshed with each other, the rotation is transmitted from the idler gear 7 to the feed reel 2. As a result, the feed reel is rotated, and the rewinding of the magnetic tape 1 is done. On the other hand, when the idler gear 7 and sensor gear 8 are meshed with each other, the rotation is transmitted from the idler gear 7 to the sensor gear 8.

The sensor gear 8 is a gear meshed with the idler gear 7 and intermediate gear 9. The sensor gear 8 is provided with optical sensors (not shown) on upper and lower portions thereof. Since the optical sensors detect variation of a quantity of light passing through a slit made in the sensor gear 8, the rotation or non-rotation of the sensor gear 8 can be detected. The rotation of the idler gear 7 is transmitted to the intermediate gear 9.

The intermediate gear 9 is a gear for transmitting the rotation, which is transmitted from the sensor gear 8 thereto, to the take-up reel 3. Owing to the intermediate gear 9, the rotating direction of the take-up reel 3 and capstan motor 4 becomes identical. As a result, the rotation of the take-up reel 3 enables the magnetic tape 1 to be rotated forward, and thereby the reproduction and a rapid forwarding of the magnetic tape are carried out.

Owing to the above-mentioned reel driving transmission path, torque is transmitted from the capstan motor 4 to the feed reel 2 or take-up reel 3.

Figure 3:
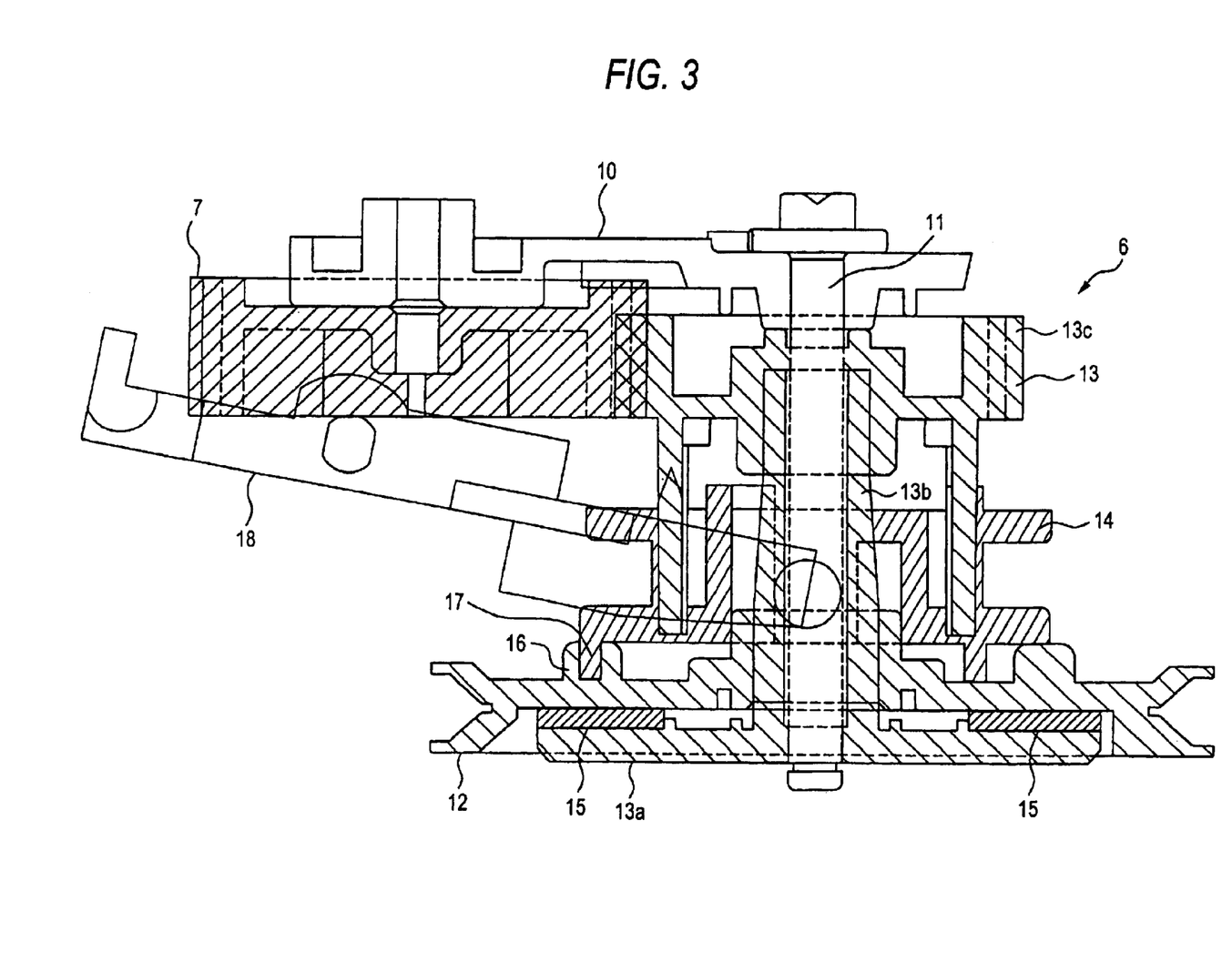
FIG. 3 is a schematic side view of the clutch mechanism and an idler gear.

FIG. 3 is a schematic side view of the clutch mechanism 6 and idler gear 7. The clutch mechanism 6 includes a first transmission shaft 11, a pulley 12, a transmission member 13, a movable clutch 14 and a constant torque transmission member 15.

The pulley 12 is supported rotatably on the first transmission shaft 11. The belt 5 is passed around the pulley 12 and a pulley on the side of the capstan motor 4. The pulley 12 thereby receives torque of the capstan motor 4, and is rotated. The pulley 12 is provided with a fixed claw 16 on an upper surface thereof.

The transmission member 13 has a plate portion 13a provided so as to be opposed to the pulley 12, a cylindrical hub 13b extending from a central section of the plate portion 13a in the upward direction, and a gear portion 13c provided on an upper end portion of the hub 13b and meshed with the idler gear 7. The first transmission shaft 11 is inserted through a central portion of the hub 13b, and this transmission member 13 is supported rotatably on the first transmission shaft 11.

The movable clutch 14 is provided on the gear portion 13c of the transmission member 13, and supported on the gear portion 13c so that the movable clutch can be relatively rotated and relatively moved in the axial direction. This movable clutch 14 has a downwardly movable claw 17 on a lower surface thereof. In this apparatus, the movable clutch 14 is moved down, and the movable claw 17 thereof is engaged (condition shown in FIG. 3) with the fixed claw 16 of the pulley 12, so that the rotation of the pulley 12 can be transmitted directly to the gear portion 13c.

The movable clutch 14 is urged by a spring (not shown) so as to apart the clutch 14 from the pulley 12. A clutch lever 18 is engaged with the movable clutch 14. The movable clutch 14 is moved down by this clutch lever 18. This enables the movable claw 17 of the movable clutch 14 to be engaged with the fixed claw 16 of the pulley 12.

The constant torque transmission member 15 is adapted to transmit torque of lower than a predetermined level from the pulley 12 to the transmission member 13, and used as a torque transmission means during the reproduction (in the condition in which the movable claw 17 and the fixed claw 16 of the pulley 12 are not engaged with each other). This constant torque transmission member 15 is an annular friction member, and held at a predetermined pressure between the pulley 12 and the plate portion 13a of the transmission member 13. When torque of not lower than a predetermined level is applied to the pulley 12 during a normal reproduction operation in this apparatus, a slip of the constant torque transmission member 15 occurs, and this can prevent excessive torque from being transmitted to the reels, and an accident such as the breakage of the magnetic tape 1 from occurring. When it is necessary to transmit a high torque for carrying out a rapid forwarding and rewinding of the magnetic tape, the fixed claw 16 and movable claw 17 are engaged with each other. This enables a high torque of the capstan motor 4 to be transmitted to the feed reel 2 and take-up reel 3.

Operation of the Magnetic tape device of FIG. 1 will be described.

First, the execution of the reproduction will be described.

In order to carry out the reproduction, the swinging member 10 is moved so that the idler gear 7 is meshed with the sensor gear 8. The movable clutch 14 is moved up by a spring (not shown), and the movable claw 17 of the movable clutch 14 is apart from the fixed claw 16 of the pulley 12. In this condition, the capstan motor 4 is rotated clockwise. The rotation of the capstan motor 4 is transmitted to the take-up reel 3 via the belt 4, pulley 12, constant torque transmission member 15, transmission member 13, idler gear 7, sensor gear 8 and intermediate gear 9. The capstan motor 4 is driven so that the take-up reel 3 attains a rotational speed suitable for the reproduction of the magnetic tape 1.

In order to carry out a rapid forwarding of the magnetic tape 1, the swinging member 10 is moved to the same position as in the case of the reproduction mentioned above. The clutch lever 18 lowers the movable clutch 14 to cause the movable claw 17 to be engaged with the fixed claw 16. As a result, the rotation from the capstan motor 4 is transmitted to the pulley 12 via the belt 5, and the rotation of the pulley 12 is directly transmitted to the transmission member 13 not via the constant torque transmission member 15. After this transmission member 13, the rotation is transmitted through the same path as in the case of the reproduction. The capstan motor 4 is driven so that a rotational speed suitable for a rapid forwarding of the magnetic tape is attained.

In order to carry out the rewinding of the magnetic tape, the swinging member is moved so that the idler gear 7 is meshed with the gear on the side of the feed reel 2. The fixed claw 16 and movable claw 17 are engaged with each other by the clutch lever 18. In this condition, the capstan motor 4 is rotated counter-clockwise. As a result, the rotation of the capstan motor 4 is transmitted to the feed roll 2 via the belt 5, pulley 12, movable clutch 14, gear portion 13c of the transmission member 13 and idler gear 17. The capstan motor 4 is driven so that a rotational speed suitable for the rewinding of the magnetic tape is attained.

Suppose that the diameter of the pulley provided on the capstan motor 4 is 20 mm; the diameter of the pulley 12 is 33 mm; the pitch circle diameters of the gear portion 13c of the transmission member 13 and the idler gear 7 are 17 mm; and the pitch circle diameter of the gear on the side of the feed reel 2 or on the side of the take-up reel 3 is 36 mm. In this case, the reduction ratio i(90) to be set when a rapid forwarding and rewinding of the magnetic tape are carried out by this apparatus becomes:

$$i(90)=(20/33)\times(17/36)=0.286$$

In the apparatus of FIG. 2, such a clutch mechanism 6 as is used in the magnetic tape device of FIG. 1 is replaced with a speed change mechanism 20 so as to attain a 300 times increased speed during rapid forwarding and rewinding of the magnetic tape.

The speed change clutch mechanism 20 includes a first transmission shaft 11, a pulley gear 21, a transmission member 22, a constant torque transmission member 23, a speed change output gear 24, a second transmission shaft 25, a speed change intermediate gear 26 and a speed change movable gear 27. This speed change clutch mechanism 20 is provided between a feed reel 2 and a take-up reel 3.

The pulley gear 21 is supported rotatably on the first transmission shaft 11, and has a pulley portion 21a. A belt 5 is passed around this pulley portion and a pulley on the side of the capstan motor 4. The pulley gear 21 has a gear portion 21b formed above the pulley portion 21a.

The transmission member 22 has a plate portion 22a provided so as to be opposed to the pulley portion 21a, a cylindrical hub 22b extending upward from a central section of the plate portion 22a, and a transmission gear portion 22c provided on an upper end section of the hub 22b. The first transmission shaft 11 is inserted through the central portion of the hub 22b, and the transmission member 22 is supported rotatably on the first transmission shaft 11.

The constant torque transmission member 23 has the same construction as the constant torque transmission member 15, and is used as a transmission means during the reproduction of the magnetic tape device. This torque transmission member 23 is made of a friction member.

The speed change gear 24 is mounted rotatably on the first transmission shaft 11, and meshed with the idler gear 7. The speed change output gear 24 has teeth the number of which is equal to that of the teeth of the transmission gear portion 22c.

The second transmission shaft 25 is provided in the vicinity of the first transmission shaft 11 and in parallel with the first transmission shaft 11.

The speed change intermediate gear 26 is mounted rotatably on a lower end portion of the second transmission shaft 25 and meshed with the gear portion 21b of the pulley gear 21. The speed change intermediate gear 26 is provided with an engagement recess 28 in an upper surface thereof.

The speed change movable gear 27 is mounted rotatably on the second transmission shaft 25 above the speed change intermediate gear 26, and movable in the axial direction of the second transmission shaft 25. The speed change movable gear 27 has at a lower end portion thereof a first gear 29 meshable with the transmission gear portion 22c, and at an upper end portion thereof a second gear 30 meshable with the speed change output gear 24. The number of the teeth of the first gear 29 and that of the teeth of the second gear 30 are equal to each other. The speed change movable gear 27 further has at a lower end portion thereof a movable claw 31 projecting downward, and, when the speed change movable gear 27 is moved down, the movable claw 31 can be engaged with the engagement recess 28 of the speed change intermediate gear 26. When the movable claw 31 is engaged with the recess 28 in this apparatus, the speed change intermediate gear 26 and speed change movable gear 1 27 are operatively connected together, so that the reduction ratio can be changed.

Figure 4A:
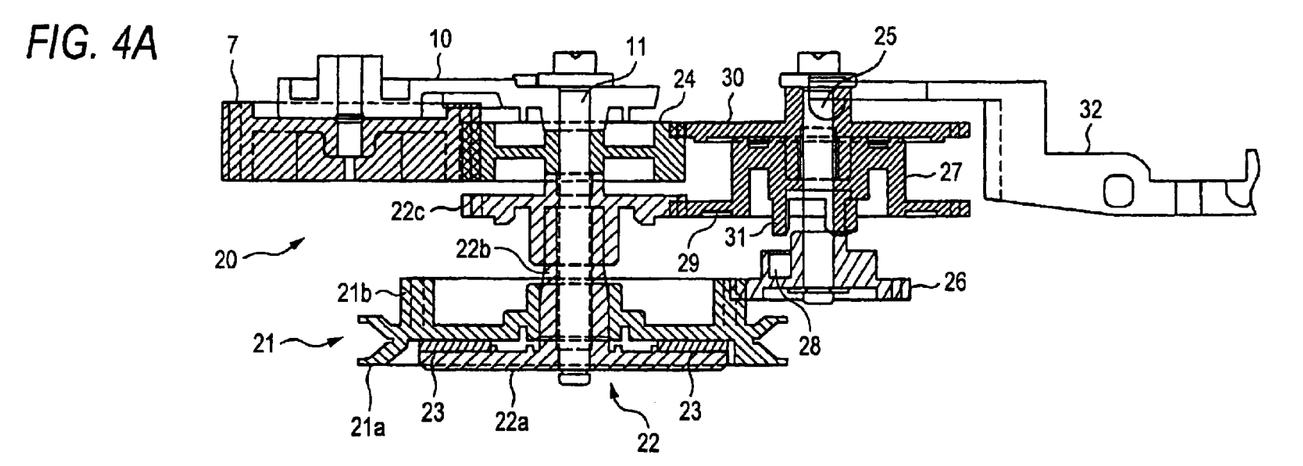
FIGS. 4A and 4B are schematic side views of the speed change clutch mechanism and an idler gear.
Figure 4B:
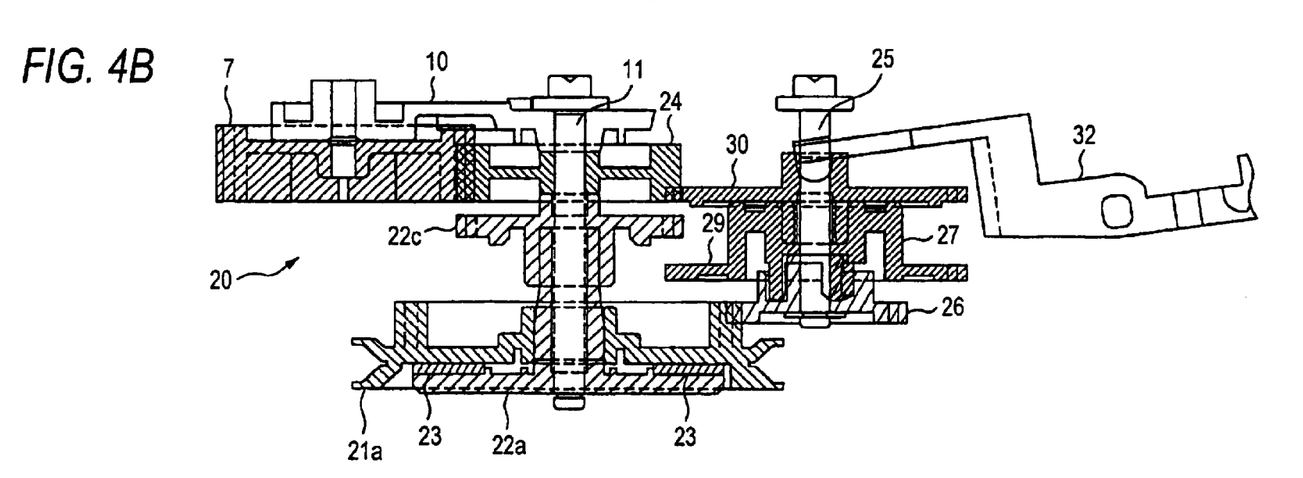

The speed change movable gear 27 is urged by a spring (not shown) so as to apart the movable gear 27 from the speed change intermediate gear 26. As shown in FIG. 4A, the speed change movable gear 27 is moved up in a normal condition, and the first gear 29 and transmission gear portion 22c and the second gear and speed change output gear 24 are meshed with each other respectively. On the other hand, a clutch lever 32 is engaged with the speed change movable gear 27. As shown in FIG. 4B, the speed change movable gear 27 is lowered by the clutch lever 32 in such a manner that the movable claw 31 is engaged with the recess 28 of the speed change intermediate gear 26.

Operation of the Magnetic tape device of FIG. 2 will be described.

First, the execution of the reproduction will be described.

In reproducing, the swinging member 10 is moved so that the idler gear 7 meshes with the sensor gear 8. The speed change movable gear 27 is raised by a spring (not shown), and the movable claw 31 of the speed change movable gear 27 is disengaged from the recess 28 of the pulley gear 21. In this condition, the capstan motor 4 is rotated clockwise. The rotation of the capstan motor 4 is transmitted to the take-up reel 3 via the belt 5, pulley gear 21, constant torque transmission member 23, transmission member 22, speed change movable gear 27 (first gear 29 and second gear 30), speed change output gear 24, idler gear 7, sensor gear 8 and intermediate gear 9. The capstan motor 4 is driven so that the rotational speed of the take-up reel 3 reaches a suitable level for the reproduction.

In order to carry out a rapid forwarding of the magnetic tape 1, the swinging member 10 is moved to the same position as in the case of the reproduction. The clutch lever 32 lowers the speed change movable gear 27 to cause the movable claw 31 to engage the recess 28. The rotation of the capstan motor 4 is transmitted to the pulley gear 21 via the belt 5. The rotation of the pulley gear 21 is transmitted to the speed change intermediate gear 26 not via the constant torque transmission member 23 but via the gear portion 21b, and then to the speed change movable gear 27. The rotation is thereafter transmitted from the second gear 30 of the speed change movable gear 27 to the take-up reel via the speed change output gear 24 and via the same path as in the case of the reproduction operation. The capstan motor 4 is driven so that a rotational speed suitable for a rapid forwarding of the magnetic tape is attained.

In order to carry out the rewinding of the magnetic tape, the swinging member 10 is moved so that the idler gear 7 meshes with the gear on the side of the feed reel 2. The speed change movable gear 27 is lowered by the clutch lever 32 to cause the movable claw 31 to engage the recess 28. In this condition, the capstan motor 4 is rotated counter-clockwise. As a result, the rotation of the capstan motor 4 is transmitted to the feed reel via the belt 5, pulley gear 21, speed change intermediate gear 26, second gear 30 of the speed change movable gear 27, speed change output gear 24 and idler gear 7. The capstan motor 4 is driven so that a rotational speed suitable for the rewinding of the magnetic tape is attained.

Suppose that the diameter of the pulley provided on the capstan motor 4 is 20 mm; the diameter of the pulley gear 21 is 33 mm; the pitch circle diameter of the gear portion 21b of the pulley gear 21 is 28 mm; the pitch circle diameter of the speed change intermediate gear 26 is 12 mm; the pitch circle diameters of the first gear 29 and second gear 30 of the speed change movable gear 27 are 23 mm; the pitch circle diameters of the speed change output gear 24 and idler gear 7 are 17 mm; and the pitch circle diameter of the gear on the side of the feed reel 2 or on the side of the take-up reel 3 is 36 mm. In this case, the reduction ratio i(300) to be set at the time of carrying out rapid forwarding and rewinding of the magnetic tape in this apparatus becomes:

$$i(300)=(20/33)\times(28/12)\times(23/17)\times(17/36)=0.903$$

On the other hand, assuming that the pitch circle diameter of the transmission gear portion 22c of the transmission member 22 is 17 mm, the reduction ratio i(P) at the time of carrying out the reproduction becomes:

$$i(P)=(20/33)\times(17/23)\times(23/17)\times(17/36)=0.286$$

In this magnetic tape device according to an embodiment of the present invention, a 90 times speeded-up apparatus and a 300 times speeded-up apparatus can be attained easily only by changing such a clutch mechanism 6 as is used in the apparatus of FIG. 1 and such a clutch mechanism 20 as is used in the apparatus of FIG. 2, without changing the other parts.

In the speed change clutch mechanism 20 for attaining a 300 times speeded-up apparatus, the second transmission shaft 25 and a part supported rotatably thereon are needed. Since these parts are provided between the feed reel 2 and take-up reel 3, they do not hamper the miniaturization of the apparatus.

<Other Embodiment>

In the above-described magnetic tape device, two gear members (speed change intermediate gear 26 and speed change movable gear 27) are mounted on the second transmission shaft 25. These parts may be integrally formed in one body.

The rotational driving apparatus of a magnetic tape device according to the present invention can be provided with a first clutch mechanism and a second clutch mechanism selectively as a clutch mechanism for a rotation transmission path. In the second clutch mechanism, which is different from the first clutch mechanism, the rotation of the motor can be transmitted by changing the speed thereof. As a result, the second clutch mechanism enables the forwarding and rewinding of a magnetic tape to be carried out at a high speed as compared with the first clutch mechanism. Since the speed of the rotation is changed when the rapid forwarding and rewinding of the magnetic tape are carried out, the reel can be rotated stably at a low speed at the time of carrying out the reproduction. Moreover, the apparatus for driving this magnetic tape device can use the parts, which are other than the clutch mechanism, in common, so that it becomes possible to improve the mass production efficiency, and manufacture the apparatus at a low cost.

What is claimed is:

1. A rotational driving apparatus of a magnetic tape device comprising:

a clutch mechanism;

a rotation transmission path change-over gear;

a feed reel; and a take-up reel, wherein a rotation of a motor is transmitted to the clutch mechanism and a rotation of the clutch mechanism is selectively transmitted to the feed reel or the take-up reel via the rotation transmission path change-over gear, the clutch mechanism can be selectively provided with a first clutch mechanism adapted to decelerate the rotation of the motor at a first reduction ratio and transmit the resultant rotation to the change-over gear, and a second clutch mechanism adapted to decelerate the rotation of the motor at a second reduction ratio and transmit the resultant rotation to the change-over gear, the first clutch mechanism comprises:
- a first shaft;
- a first pulley supported rotatably on the first shaft and adapted to receive the rotation of the motor;
- a first clutch output gear supported rotatably on the first shaft and meshed with the change-over gear;
- a first constant torque transmission member provided between the first pulley and first clutch output gear and adapted to transmit torque of the first pulley lower than a predetermined level to the first clutch output gear; and
- a clutch member adapted to transmit a rotation of the first pulley to the first clutch output gear directly or via the first constant torque transmission member, and the second clutch mechanism comprises:
- a second shaft;
- a second pulley supported rotatably on the second shaft;
- a second clutch output gear supported rotatably on the second shaft and meshed with the change-over gear;
- a second constant torque transmission member provided between the second pulley and second clutch output gear and adapted to transmit torque of the second pulley lower than a predetermined level to the second clutch output gear; and
- a speed change clutch member provided close to the second shaft and adapted to transmit a rotation of the second pulley to the second clutch output gear directly or via the second constant torque transmission member with a speed of the rotation changed.

2. A rotational driving apparatus of a magnetic tape device according to claim 1, wherein the clutch member of the first clutch mechanism is supported on the first shaft rotatably and axially movably so that the clutch member can be engaged with and disengaged from the first pulley, a rotation of the first pulley is transmitted to the first clutch output gear via the first constant torque transmission member with the clutch member disengaged from the first pulley, and the rotation of the first pulley is transmitted to the first clutch output gear directly with the clutch member engaged with the first pulley.

3. A rotational driving apparatus of a magnetic tape device according to claim 1, wherein the second pulley of the second clutch mechanism has a gear portion at an outer circumferential section thereof, the second clutch mechanism has a transmission gear to which the rotation of the second pulley is transmitted via the second constant torque transmission member, the speed change clutch member of the second clutch mechanism comprises:
- a speed change support shaft provided in parallel with the second shaft;
- a speed change intermediate gear supported rotatably on the speed change support shaft and meshed with the gear portion of the second pulley; and
- a clutch supported on the speed change support shaft rotatably and axially movably so that the clutch can be engaged with and disengaged from the speed change intermediate gear, the clutch having a first gear portion meshable with the transmission gear and a second gear portion meshable with the second clutch output gear, the clutch adapted to transmit a rotation of the transmission gear to the second clutch output gear via the first gear portion and second gear portion with the clutch disengaged from the speed change intermediate gear, and transmit a rotation of the speed change intermediate gear to the second clutch output gear via the second gear portion with a speed of the rotation changed and with the clutch engaged with the speed change intermediate gear, the first gear portion and second gear portion have the same number of teeth, which is greater than the number of teeth of the speed change intermediate gear, and the transmission gear and second clutch output gear have the same number of teeth, which is smaller than the number of teeth of the gear portion of the second pulley.

4. A rotational driving apparatus of a magnetic tape device according to claim 2, wherein the second pulley of the second clutch mechanism has a gear portion at an outer circumferential section thereof, the second clutch mechanism has a transmission gear to which the rotation of the second pulley is transmitted via the second constant torque transmission member, the speed change clutch member of the second clutch mechanism comprises:
- a speed change support shaft provided in parallel with the second shaft;
- a speed change intermediate gear supported rotatably on the speed change support shaft and meshed with the gear portion of the second pulley; and
- a clutch supported on the speed change support shaft rotatably and axially movably so that the clutch can be engaged with and disengaged from the speed change intermediate gear, the clutch having a first gear portion meshable with the transmission gear and a second gear portion meshable with the second clutch output gear, the clutch adapted to transmit a rotation of the transmission gear to the second clutch output gear via the first gear portion and second gear portion with the clutch disengaged from the speed change intermediate gear, and transmit a rotation of the speed change intermediate gear to the second clutch output gear via the second gear portion with a speed of the rotation changed and with the clutch engaged with the speed change intermediate gear, the first gear portion and second gear portion have the same number of teeth, which is greater than the number of teeth of the speed change intermediate gear, and the transmission gear and second clutch output gear have the same number of teeth, which is smaller than the number of teeth of the gear portion of the second pulley.

5. A rotational driving apparatus of a magnetic tape device according to claim 1, wherein a space is defined between the first pulley and one of the feed reel and take-up-reel when the clutch mechanism is provided with the first clutch mechanism, and the space is capable of disposing the speed change clutch member of the second clutch mechanism.

6. A rotational driving apparatus of a magnetic tape device comprising:

a clutch mechanism;

a rotation transmission path change-over gear;

a feed reel; and a take-up reel, wherein the clutch mechanism comprises:

a first shaft;

a pulley supported rotatably on the first shaft, the pulley having a gear portion at an outer circumferential section thereof and adapted to receive the rotation transmitted from a motor;

a transmission gear supported rotatably on the first shaft;

a constant torque transmission member adapted to transmit torque of the pulley lower than a predetermined level to the transmission gear;

a speed change output gear supported rotatably on the first shaft and meshed with the change-over gear;

a second shaft provided in parallel with the first shaft;

a speed change intermediate gear supported rotatably on the second shaft and meshed with the gear portion of the pulley; and a clutch having a first gear portion meshable with the transmission gear and a second gear portion supported axially movably and rotatably on the second shaft and meshable with the speed change output gear, the clutch being movable to a first position in which the clutch is disengaged from the speed change intermediate gear and transmits the rotation of the transmission gear to the speed change output gear via the first gear portion and second gear portion, and to a second position in which the clutch is engaged with the speed change intermediate gear and transmits the rotation of the speed change intermediate gear to the speed change output gear via the second gear portion.

7. A magnetic tape device comprising:

a motor;

a clutch mechanism;

a rotation transmission path change-over gear;

a feed reel; and a take-up reel, wherein the clutch mechanism comprises:

a first shaft;

a pulley supported rotatably on the first shaft, the pulley having a gear portion at an outer circumferential section thereof and adapted to receive the rotation transmitted from the motor;

a transmission gear supported rotatably on the first shaft;

a constant torque transmission member adapted to transmit torque of the pulley lower than a predetermined level to the transmission gear;

a speed change output gear supported rotatably on the first shaft and meshed with the change-over gear;

a second shaft provided in parallel with the first shaft;

a speed change intermediate gear supported rotatably on the second shaft and meshed with the gear portion of the pulley; and a clutch having a first gear portion meshable with the transmission gear and a second gear portion supported axially movably and rotatably on the second shaft and meshable with the speed change output gear, the clutch being movable to a first position in which the clutch is disengaged from the speed change intermediate gear and transmits the rotation of the transmission gear to the speed change output gear via the first gear portion and second gear portion, and to a second position in which the clutch is engaged with the speed change intermediate gear and transmits the rotation of the speed change intermediate gear to the speed change output gear via the second gear portion.

* * * * *